Figure 1:
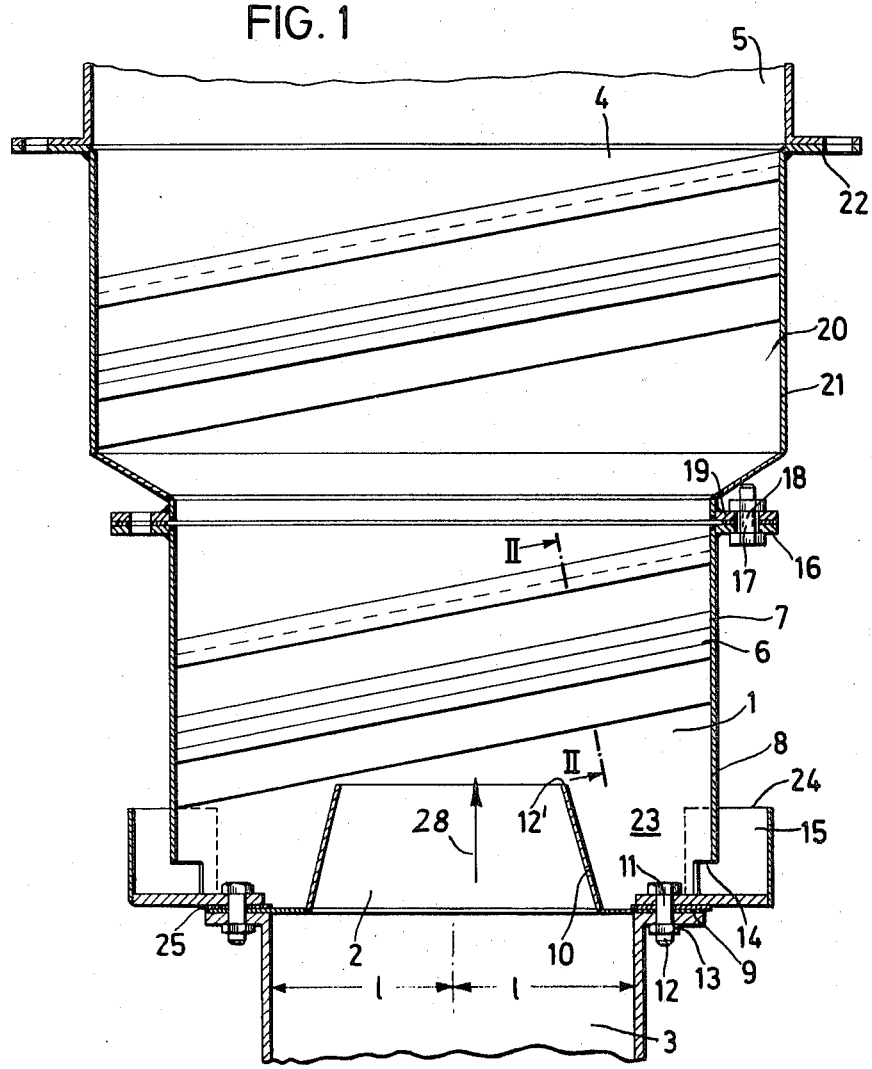

United States Patent [19]
Wetteborn

[11] 3,830,044
[45] Aug. 20, 1974

[54] DEVICE FOR SEPARATING DROPS OF LIQUID FROM A FLOWING GASEOUS MEDIUM

[75] Inventor: Wilhelm Wetteborn, Troisdorf, Germany

[73] Assignee: Klockner-Humboldt-Deutz Aktiengesellschaft, Koln, Germany

[22] Filed: Dec. 22, 1972

[21] Appl. No.: 317,759

[30] Foreign Application Priority Data
Dec. 22, 1971 Germany............................ 2163735

[52] U.S. Cl.................................... 55/440, 55/466
[51] Int. Cl............................................ B01d 45/08
[58] Field of Search............................ 55/437–439, 55/440, 444–446, 466

[56] References Cited
UNITED STATES PATENTS
3,525,197   8/1970   Sheehan................................ 55/440

FOREIGN PATENTS OR APPLICATIONS
906,644   9/1962   Great Britain........................ 55/443
1,157,466   7/1969   Great Britain........................ 55/440

*Primary Examiner*—Bernard Nozick
*Attorney, Agent, or Firm*—Herbert L. Lerner

[57] ABSTRACT

Device for separating drops of liquid from a flowing gaseous medium, includes a flow housing defining a substantially vertical flow path for gaseous medium, at least one row of parallel separation baffles extending transversely to the flow path, the separation baffles mutually overlapping louver-like and, respectively, having an impact surface and formed with a collecting trough, the separation baffles being disposed in the flow housing so that the collecting troughs are inclined with respect to the horizontal, and means defining a receiving channel for liquid collected in the collecting troughs of the separating baffles, the receiving channel being located within the flow housing adjacent the wall of the housing below and spaced from the separation baffles, the channel-defining means being of at least partially annular shape and formed with at least one liquid outlet opening.

8 Claims, 2 Drawing Figures

DEVICE FOR SEPARATING DROPS OF LIQUID FROM A FLOWING GASEOUS MEDIUM

The invention relates to a device for separating drops of liquid from a flowing gaseous medium, and more particularly to such device which includes a flow housing, at least one row of parallel separation baffles extending transversely to the direction of flow of the gaseous medium in the flow housing, the separation baffles overlapping louver-like and, respectively, having an impact surface and formed with a collecting trough.

A separator of the aforementioned type is known from German Patent No. 1,542,248.

It is an object of the invention to improve the aforementioned, heretofore known separator and to broaden the field of use thereof so that it can also be directly built into a vertically disposed gas conduit.

With the foregoing and other objects in view, there is provided in accordance with the invention, a device for separating drops of liquid from a flowing gaseous medium, comprising a flow housing defining a substantially vertical flow path for gaseous medium, at least one row of parallel separation baffles extending transversely to the flow path, the separation baffles mutually overlapping louver-like and, respectively, having an impact surface and formed with a collecting trough, the separation baffles being disposed in the flow housing so that said collecting troughs are inclined with respect to the horizontal, and means defining a receiving channel for liquid collected in the collecting troughs of the separation baffles, the receiving channel being located within the flow housing adjacent the wall of the housing below and spaced from the separation baffles, the channel-defining means being of at least partially annular shape and formed with at least one liquid outlet opening. This construction of the device of the invention permits it to be installed in a relatively simple and advantageous manner in substantially vertical exhaust gas lines, washing or scrubbing towers or similar devices, wherein the exhaust gas flow that is to be purified travels in substantially vertical direction. Surprisingly, it has been found that the liquid separator per se can be installed in substantially vertically oriented exhaust gas lines wherein the gas flow is directed from the bottom to the top thereof. In this often advantageous type of installation, very good separating action has been demonstrated, although the collecting channel of each separating baffle is essentially open toward the direction of flow of the oncoming gas, i.e. open downwardly, a construction which, based upon heretofore assumed concepts, rendered impossible any separation of liquid. Moreover, due to the advantageous inclination of the collecting trough with respect to the horizontal, the liquid deposited on the impact surface and collected in the collecting trough, is conducted along the trough and towards the wall of the flow housing, and thereby reaches the calmed or stabilized zone of the gas flow. The liquid can consequently flow along the wall of the flow housing into the receiving channel located beneath the baffles, without being again entrained by the gas flow.

In accordance with another feature of the invention, the separating baffles are disposed in such a manner, that the collecting troughs are inclined at an angle of about 10° with respect to the horizontal. Through this feature of the invention, good run-off of the separated liquid for relatively low structural height of the device of the invention is achieved, in addition to good flow conditions through the separator with optimum separating action of the baffles.

In accordance with another feature of the invention, the separating device includes a plurality of rows of baffles, preferably combined in groups, which are disposed one behind the other or in tandem, in the gas flow direction in the flow path, the flow path having a cross section increasing in the gas flow direction. Thereby, the separated liquid runs off the upper rows of baffles and along the wall of the flow housing into a constantly calmed or stabilized, virtually flow-free zone.

In accordance with a further feature of the invention, the flow housing comprises first and second housing members connected, preferably by a releasable connection, one above the other, at least one row of the parallel separation baffles being disposed in each of the housing members, the means defining a receiving channel being located in the lower of the two housing members and below the separation baffles. Through this feature of the invention, the required separation or the degree of separation by the device can be maintained also for varying particle sizes and particle percentages in the gas flow that is to be purified, by stepwise serially connecting several housings to one another, in a relatively simple manner. The individual steps or stages of the device preferably have a circular cross section, so that, for the variations in cross section, unnecessarily large pressure losses due to additional changes in shape are avoided.

In accordance with an added feature of the invention, the device includes a preferably removably mounted gas inlet nozzle located at the bottom of the flow housing and extending coaxially thereto in direction of the flow path. A particular advantage of this construction is that, with a gaseous medium which flows through the inlet channel at a velocity of less than 3 m/sec, the flow velocity can be increased by an appropriate nozzle, so that velocity ranges are attainable within the separator of the invention which assure optimal separation results.

In accordance with an additional feature of the invention, the device includes a removable closure plate connected to the upstream end of the gas inlet nozzle in flow direction of the gas and partly defining a space located thereabove, and means defining at least one liquid drain opening in communication with the space. Through this feature, the gaseous medium, flowing from the bottom to the top of the flow housing, is guided as far as possible to the vicinity of the separation baffles, the receiving channel for the separated liquid, which is defined by the nozzle, the closure plate and the housing wall, being disposed in a flow-free zone, and entrainment anew of the particles of liquid into the gas flow being thereby avoided. With the added feature of a preferably removable closure plate provided with a nozzle, it is advantageously possible to match or adjust a separator of given dimensions with the dimensions of the respective exhaust gas lines of varying cross sections. Assurance is thereby provided in an advantageous manner of versatile and economical application or use of the separator of the invention.

In accordance with a concomitant feature of the invention, the liquid outlet opening comprises a cut-out formed in the wall of the flow housing, and the means defining a liquid receiving channel includes the wall of the gas inlet nozzle mounted in the flow housing coaxially to the housing and extending vertically therein to a predetermined height, and further including an ascending overflow channel located outside the flow housing and communicating with the liquid receiving channel through the cut-out outlet opening, the overflow channel having an overflow edge spaced below the upper edge of the nozzle wall so that the level of liquid received in the liquid receiving channel is adjusted below the predetermined height of the nozzle wall. The advantage of such a construction is that the liquid drain opening remains permanently closed by the liquid column present in the rising overflow canal, independently of the amounts of liquid deposited or separated in the separator device, a collapse of the pressure in the flow housing being prevented by the liquid column present in the overflow channel. This consequently prevents particularly the re-entry of the previously separated liquid into the gas flow over the edge of the collecting channel, necessitating a repetition of the separation thereof from the gaseous medium.

Although the invention is illustrated and described herein as device for separating drops of liquid from a flowing gaseous medium, it is nevertheless not intended to be limited to the details shown, since various modifications may be made therein without departing from the spirit of the invention and within the scope and range of the equivalents of the claims.

Figure 2:
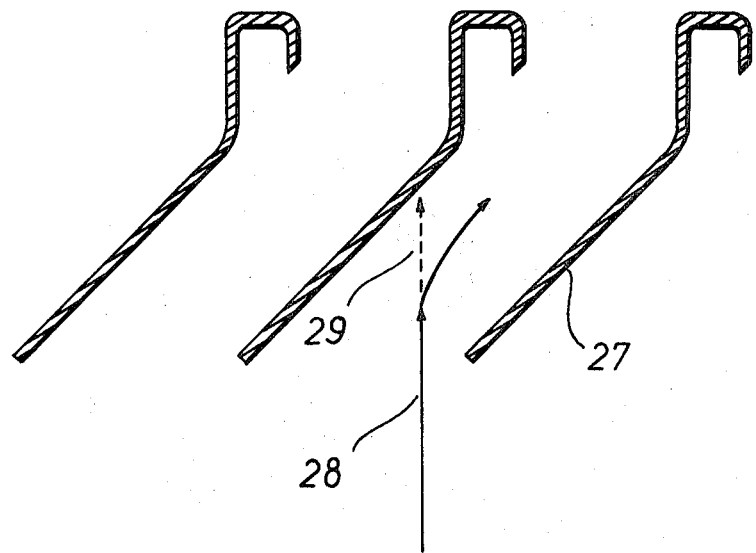

The invention, however, together with additional objects and advantages thereof will be best understood from the following description when read in connection with the accompanying drawing, in which:

FIG. 1 is a longitudinal sectional view, partly schematic, of a liquid separator constructed in accordance with the invention which is installed in a gas line; and FIG. 2 is an enlarged cross-sectional view of FIG. 1 taken along the line II—II in the direction of the arrows.

Referring now to the drawing and first, particularly, to FIG. 1 thereof, there is shown therein the device for separating drops of liquid from a flowing gaseous medium, according to the invention, which includes a flow housing member 1 that is coaxially connected at an inlet opening 2 thereof to a vertically disposed gas duct 3 which feeds to the separating device gaseous medium that is to be purified. The separator of the invention is connected at an output opening 4 thereof with a vertically disposed gas duct 5 which carries the purified gaseous medium away. Separating baffles 6, which are further illustrated in FIG. 2 and which have a respective impact surface 27 that is set at an angle to the flow direction of the gaseous medium and, in the region of the downstream edge thereof, a collecting trough 26, are secured to the housing wall 7, inclined at a given angle, preferably at an angle of about 10°, with respect to the horizontal, and extend over the entire, preferably circular, cross section of the flow housing 1. As can be seen from FIG. 1, two rows of baffles which have mutually offset or staggered flow openings are disposed serially or in tandem in the illustrated embodiment and thus form a baffle group.

In the vicinity of the gaseous medium inlet 2, the flow housing member 1 is closed by a closure plate 9 which is provided with a nozzle 10 that extends coaxially to and into the flow housing member 1 up to about the row of baffles. The nozzle 10 is moreover radially spaced from the wall 7 of the flow housing member 1.

The closure plate 9, which is firmly connected to the nozzle 10, is advantageously formed at the outer periphery thereof with several bores 11. At the lowest part of the housing wall 7, bolts 12, having a diameter corresponding to the diameter of the bores 11, are suitably disposed. The closure plate 9 and the flowing housing member 1 are mutually disconnectible by means of nuts 13 and, with the aid of the gasket or seal 25, are bolted together pressuretightly. The closure plate 9, the nozzle 10 and the wall 7 of the flow housing member 1 define an annular space that communicates through a cut-out 14 with two overflow channels 15 which are located on the outside of the flowing housing member 1, on opposite sides thereof.

The flow housing member 1 has, in the upper region thereof, at the housing wall 7, a circular flange 16 located on the outside of the housing, and having several through-bores 17 formed at the periphery thereof. The bores 17 correspond to through-bores 18 formed in a flange 19 which is located at the lower housing wall 21 of another flow housing member 20. Both flow housing members 1 and 20 are firmly connected one to the other, preferably through releasable connections, for example, by screws or bolts, and are basically similar in mechanical construction. At the upper region of the wall 21 of the flow housing member 20, a flange 22 is disposed, to which the gas exhaust duct 5 is connected. To particular advantage, the afterconnected or downstream flow housing member 20, as viewed in the direction of the gas flow represented by the arrow 28, has a larger diameter than the upstream flow housing member 1.

In the enlarged cross-sectional view of FIG. 2, three separating or precipitation baffles of two respective baffle rows are connected in tandem or series. The sides of the baffles against which the gas flow impinges constitute the impact surfaces 27, and are always set at an angle to the gas flow. Particles or drops entrained by the flow essentially maintain their flow direction 28 due to their larger mass and accordingly arrive at the impact surfaces 27. The moment they adhere to the impact surface 27, they move more or less rapidly into the collecting channel 26 under the influence of the flow and in dependence upon the flow velocity.

The operation of the device is described hereinafter in detail.

The drops of liquid to be separated from a flowing gaseous medium arrive, in their passage through the flow housing 1, 20, at the respective impact surfaces 27 and, from there, at the collecting trough 26 of each baffle 6. Due to the flow conditions in the vicinity of the collecting trough 26, the separated or deposited liquid is retained in the collecting trough 26, even if the latter is upside down i.e. opens downwardly, the separated liquid being guided to the wall 7 of the flow housing along the trough 26, aided by the slight inclination of the baffle 7, and flowing along the wall 7 from the above to the lower region of the flow housing. The separated liquid is collected in the receiving channel 23 at the bottom of the housing, and drained off through the overflow channel 15, which communicates with the receiving channel 23 through the cut-out 14. The minimum height of the liquid drain opening 24, which is usually connected to atmosphere, is such that at no point of operation of the separator will a liquid level be reached that is higher than the edge 12' of the receiving channel 23, nor will any amount of liquid already precipitated or separated be entrained anew by the gas flow and carried into the separator.

Although a very high degree of separation is as a rule already achieved after the gas medium has passed through the first group of baffles formed of two rows of baffles, two or more separators can be connected in series, if the highest standards of purity of the medium are demanded. The liquid separated in the baffle group of the after-connected flow housing member 20 flows under gravity influence down the wall 21 of the housing member 20, due to the similar construction thereof to that of the flow housing member 1, and is collected in the receiving channel 23 and drained or discharged together with the previously separated liquid through the liquid drain opening 24.

The device of the invention is suited not only for separating drops of liquid from a flowing gaseous medium, but also for separating fine solid particles, such as dust, for example, which are bound to the drops of liquid in the so-called wet process, before the gaseous medium passes through the separator in a fore-connected or upstream spray device, and are carried off into the receiving channel by the liquid film after they impinge on the impact surface.

I claim:

1. Device for separating drops of liquid from a flowing gaseous medium, comprising a flow housing having a bottom inlet and defining a substantially vertical upward flow path for gaseous medium, at least one row of parallel separation baffles in said housing extending transversely to said flow path, said separation baffles mutually overlapping louver-like and each having an impact surface and formed with an inverted collecting trough, said separation baffles being inclined with respect to the horizontal, and means defining a receiving channel for liquid collected in the collecting troughs of said separation baffles, said receiving channel being located within said flow housing adjacent the bottom wall of said housing below and spaced from said separation baffles, said channel-defining means being defined by the housing wall and inlet and being of at least partially annular shape and formed with at least one liquid outlet opening adjacent to the bottom of said housing.

2. Device according to claim 1 including a plurality of rows of said parallel separation baffles disposed one behind the other in the gas flow direction in said flow path, said flow path having a cross section increasing in the gas flow direction.

3. Device according to claim 1 wherein said liquid outlet opening comprises a cut-out formed in the wall of said flow housing, and said means defining a liquid receiving channel including the wall of a gas inlet nozzle mounted in said flow housing coaxially to the housing and extending vertically therein to a predetermined height, and further including an ascending overflow channel located outside said flow housing and communicating with said liquid receiving channel through said cut-out liquid outlet opening, said overflow channel having an overflow edge spaced below the upper edge of said nozzle wall so that the level of liquid received in said liquid receiving channel is adjusted below the predetermined height of said nozzle wall.

4. Device according to claim 1 wherein said flow housing comprises first and second housing members connected one above the other, at least one row of said parallel separation baffles being disposed in each of said housing members, said means defining a receiving channel being located in the lower of the two housing members and below said separation baffles.

5. Device according to claim 4 wherein said first and second housing members are connected to one another by a releasable connection.

6. Device according to claim 1 including a gas inlet nozzle located at the bottom of said flow housing and extending coaxially thereto in direction of said flow path.

7. Device according to claim 6 wherein said nozzle is removably mounted in said flow housing.

8. Device according to claim 7 including a removable closure plate connected to the upstream end of said gas inlet nozzle in flow direction of the gas and partly defining a space located thereabove, and means defining at least one liquid drain opening in communication with said space.

* * * * *